June 1, 1943.  C. V. LITTON  2,320,941
METHOD OF FABRICATING VACUUM TUBES
Filed May 12, 1942
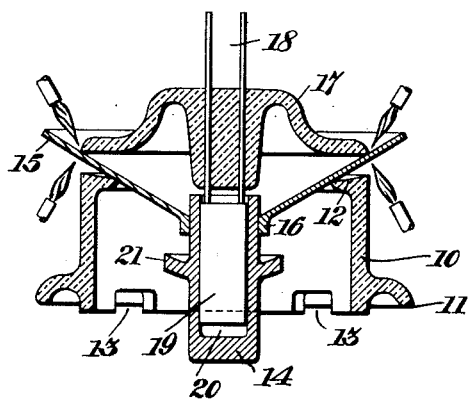
Fig:1.
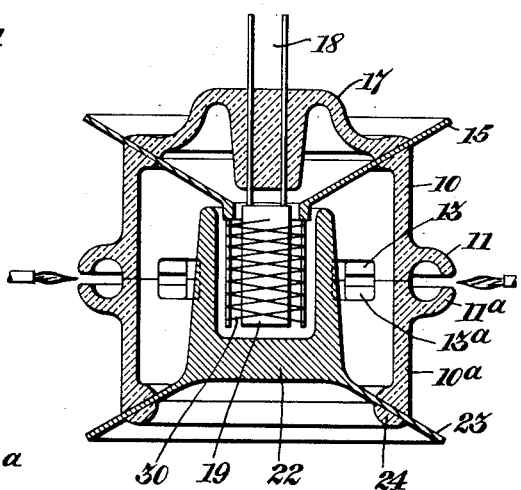
Fig:3.
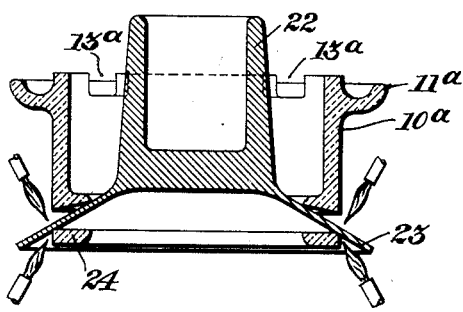
Fig:2.
INVENTOR
CHARLES V. LITTON
BY
ATTORNEY Patented June 1, 1943

2,320,941

UNITED STATES PATENT OFFICE 2,320,941

METHOD OF FABRICATING VACUUM TUBES

Charles V. Litton, Redwood City, Calif., assignor to International Standard Electric Corporation, New York, N. Y., a corporation of Delaware Application May 12, 1942, Serial No. 442,635

4 Claims. (Cl. 250—27.5)

This invention relates to vacuum tubes and more particular to an improved method of fabricating vacuum tube structures.

Vacuum tubes are generally made of parts which must be accurately formed at the time the tube is put together in order to assure proper spacing of all the tube elements. Particularly, in the case of vacuum tubes having a glass envelope, distortion of the glass at the time the tube is assembled often causes displacement of parts so that the characteristics of the completed tube are not always the same as those for which it had been designed.

It is an object of my invention to provide a system and method for fabricating vacuum tube structures from previously accurately prepared glass and metal parts, so that the tube may be quickly assembled and at all times have the proper electrode spacing.

According to a feature of my invention previously prepared parts are assembled in approximately the relationship in which they are intended to be finally fixed and after heating to soften the glass, the parts are forced into position to complete sealing together of elements of the tube and properly to position the elements supported therein.

A better understanding of my invention and the objects and features thereof may be had from the particular description thereof made with reference to the accompanying drawing in which Fig. 1 illustrates an arrangement for assembling the parts of a vacuum tube cathode and grid supporting element;

Fig. 2 illustrates an assembly for providing the anode structure for the vacuum tube, and Fig. 3 illustrates the arrangement for completing the vacuum tube assembly.

In accordance with my invention a vacuum tube may be assembled from pre-formed parts. In Fig. 1 the arrangement for assembling a cathode and a grid supporting cone are shown. In this arrangement there is provided a tubular glass member 10, provided with an outwardly extending flange 11 at one end, the function of which will be described later, and at the other end a thickened portion 12. In the edge of glass member 10 adjacent flange 11 are provided a number of notches 13. The purpose of these notches 13 will also be described later. The tubular member 10 is rigidly supported concentrically with a guiding and stop member 14. The supports for holding members 10 and 14 in rigid fixed positions are not shown and may be of any desired form. A conical grid seal member 15 is placed on the upper end of tube 10. Member 15 may be arranged to rest, preferably so that it contacts the inner edge of part 12 of tubular member 10. An inner opening of member 15 is arranged to be substantially in contact with the outer surface of member 14 and is provided at that portion with an extending ring portion 16 which may be used to support the grid when used in the tube. Above member 15 is placed a glass plate assembly 17 through which are sealed the cathode leads 18 on which is mounted the cathode 19. Cathode 19 is arranged within a central bore 20 in member 14 to assure proper centering of cathode 19. Member 14 is also provided with a ring portion 21, which has curved faces adapted upon contact of parts 16 of member 12, to accurately center member 15 with respect to cathode 19.

The members of the assembly having been put in place heat is applied at member 15 sufficient to soften the glass on the upper end of member 12, and the corresponding adjacent portion of plate 17. The parts are then forced together to push more glass into contact with plate 15, which preferably is of copper, and at the same time to produce the metal-to-glass seal between members 10, 15 and 17, as can be seen more clearly in Fig. 3. As the members are pushed downwardly, and the seal is made, cathode 19 reaches the bottom of the bore 20, the initial space between the cathode and the bottom of the bore being made just sufficient to provide the proper deformation of the glass to form a good seal. At the same time member 15 is forced downwardly and comes into contact with the ring portion 21, thus properly spacing the grid support 16 with respect to cathode 19, not only longitudinally but also centrally. The assembled members grid support 15 and cathode 19 are thus properly spaced with respect to each other and tube 10 for the complete tube assembly.

A similar arrangement to that shown for Fig. 1 is used for constructing the anode end of the tube. This arrangement is shown in Fig. 2. In accordance with this arrangement a generally tubular glass member 10a is provided, formed substantially in the same manner as member 10 with an extending flange 11a, and notched openings 13a. The anode 22 is provided at its upper end with an outwardly extending flange 23 which preferably has substantially the same slope as cone 15. It should be understood that this anode flange may be arranged on any other part of the anode depending on the tube design. The anode 22 is placed so that the flange is in contact with one end of ring 13a. On the outer surface of flange 23 is placed a glass ring 24 which may be necessary if the metal of flange 22 is copper, in order to complete the metal-to-glass seal.

In completing the anode assembly member 10a is held in fixed relationship with respect to a stop member, not shown, which preferably consists of a member extending into the opening of anode 22, leaving a sufficient space at the end thereof to permit a good seal to be made between members 10a, 23 and 24, but stopping the downward movement of anode 22 at the point where the anode will be properly spaced with respect to the grid cathode assembly constructed in Fig. 1.

These two parts once having been made, members 10 and 10a are placed one on the other in aligned relationship as shown in Fig. 3. When so placed anode 23 will be properly spaced with respect to the cathode 19 and the grid 30 which has been mounted on supporting cone 15.

When these two parts are put together as illustrated, the fixed ends of tubes 10 and 10a serve properly to space all of the elements longitudinally. At the same time flanges 11 and 11a extend outwardly and close to one another, but not touching. The tube as thus assembled is then heated to soften flanges 11 and 11a. Softened flanges 11 and 11a are then deformed into contact with one another completing the sealing together of these parts of the tube. Notches 13 and 13a are provided so that after the parts are assembled the entire tube may be readily evacuated. The opening formed by 13 and 13a, permits the gas that otherwise would be trapped in the space formed by flanges 11 and 11a readily to enter into the main portions of the tube to be evacuated. If these notches are not provided the slow seepage of gas between the contiguous edges would unduly lengthen the time necessary for evacuation.

It should be distinctly understood that the method of my invention, while it has been illustrated to a particular type of vacuum tube, is applicable to tubes of any kind. The principal features of my invention reside in the prefabrication of parts of a tube so that the entire tube may be quickly, cheaply and accurately assembled to space correctly all of the electrodes of the tube. It is obvious that many departures from the specific illustration given may be made without departing from the scope of my invention.

What I claim is:

1. The method of forming a partial assembly for a vacuum tube assembly using a fixed centering means provided with a stop therein and previously prepared parts comprising a tubular glass portion, a metallic portion with an extending flange greater in diameter than said tubular members, and a second glass member of substantially the same diameter as said tubular member, comprising placing said tubular member with one end fixed in position with respect to said centering means, placing said metal portion and said second glass portion on the end of said cylinder with at least one of said portions cooperating with its centering means, heating said metal portion and the parts of the glass portions adjacent thereto to soften the glass and forcing said portions downwardly to deform said glass and seal said parts together until at least one of said parts encounters said stop.

2. The method according to claim 1, wherein said second glass portion comprises an electrode supporting plate for a vacuum tube and said metal portion comprises a grid supporting means, said stop means being arranged to simultaneously fix the longitudinal spaced relation of said electrode and said grid supporting means with respect to said tubular member, and to center said grid supporting means with respect to said electrode.

3. The method according to claim 1, wherein said metallic portion comprises an anode, and said stop means serves to fix the final longitudinal position of said anode with respect to said tubular member.

4. The method of making a vacuum tube from previously prepared parts wherein said parts comprise a substantially tubular glass portion held in fixed position, a sheet like metal portion placed on one end of said tubular portion, and a further glass portion above said sheet metal portion, which comprises applying heat to said metal portion and the parts of said glass contiguous thereto to soften said parts of said glass, deforming said softened glass by pressure tending to press said further glass portion and said metal portion toward said fixed tubular portion, and further comprising the provision of stop means to limit movement of said metal portion and said further glass portion, whereby when a seal is completed among said portions, said portions have a predetermined fixed position with respect to said tubular portion and each other.

CHARLES V. LITTON.